UNITED STATES PATENT OFFICE.

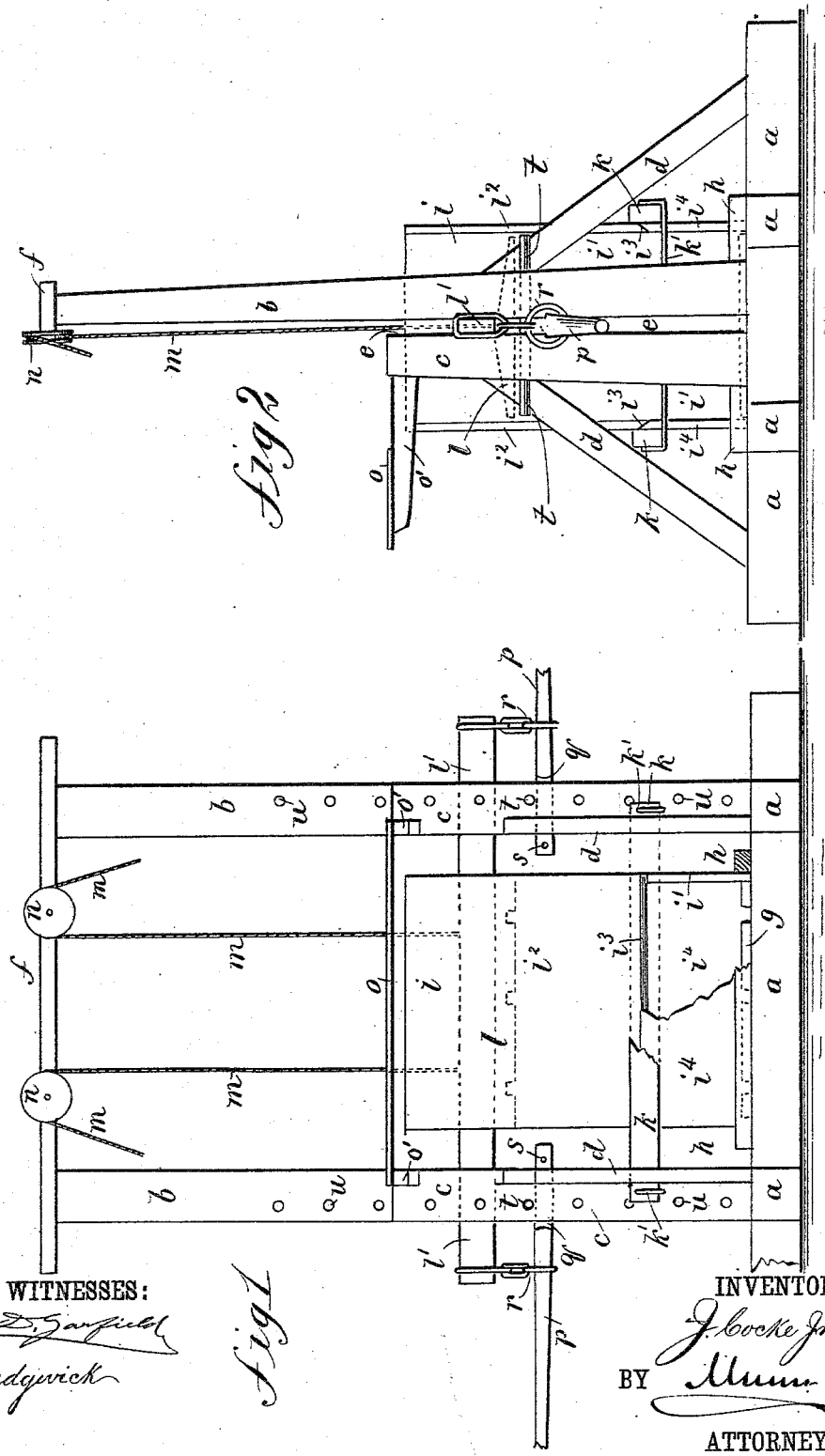

JOHN COCKE, JR., OF GREENSBOROUGH, ALABAMA.

HAY AND COTTON PRESS.

SPECIFICATION forming part of Letters Patent No. 283,571, dated August 21, 1883.

Application filed May 17, 1883. (No model.)

*To all whom it may concern:*

Be it known that I, JOHN COCKE, Jr., of Greensborough, in the county of Hale and State of Alabama, have invented a new and Improved Hay and Cotton Press, of which the following is a full, clear, and exact description.

My invention relates to that class of presses adapted to be worked to form the bale by forcing the follower-block against the material by hand-levers, the object of my invention being to provide a press of this class at once simple, inexpensive, powerful, and durable.

The invention consists of the combination and arrangement of parts, substantially as hereinafter fully set forth and claimed.

Reference is to be had to the accompanying drawings, forming part of this specification, in which similar letters of reference indicate corresponding parts in both the figures.

Figure 1 is a partly-broken front view of my improved press, and Fig. 2 is a side or end view, looking toward the left of Fig. 1.

I make a substantial frame for the press of heavy sills, $a$, suitably boxed together where they cross each other, and on these sills, at the sides or ends of the press, I support the pairs of posts or standards $b\ c$, the feet of which may be tenoned or socketed into the sills, the posts being firmly stayed by inclined braces $d$, boxed into both sills and posts in a manner to hold these posts $b\ c$ rigidly against movement toward or from each other, to maintain a space, $e$, between them to form ways at each side of the press in which the follower-block is guided, the posts $b$ being connected at the top by a cross-tie, $f$.

On the press-bed I locate the usual plate, $g$, grooved for receiving the bale-ties, and also the heavy cleats $h$, between which and plate $g$ the baling-box $i$ is placed, and held in proper relative position to receive the follower-block. I make the baling-box $i$ with slotted ends $i'$, extending from top to bottom of the box, and with upper side plates, $i^2$, reaching but part way to the bottom, the ends $i$ and side plates, $i^2$, being rigidly fastened together, and the lower edges of plates $i^2$ are beveled from the outside downward and inward toward the baling space or chamber, as at $i^3$. The spaces between the beveled edges $i^3$ and the press-bed are of sufficient width or height to discharge the pressed bale therethrough to either side, and I close said space for pressing another bale in the box $i$ by the removable lower side plates, $i^4$, which fit between plate $g$ and side cleats, $h$, and are beveled downward and inward at the top edges to lie closely on the beveled edges $i^3$ of upper side plates, $i^2$, with the inner and outer faces of the side plates, $i^2\ i^4$, in line with each other, which construction of bevel-joints offers no obstruction to the smooth downward pressing of the material in the baling-box, and also permits the lower plates, $i^4$, to fall outward to permit tying and discharging the pressed bale after the brace-bars $k$ are removed from the outside of plates $i^4$, or from over the bevel-joints $i^3$, said bars $k$ being held for bracing the plates against the outward pressure of forming the bale by any approved headed or L-shaped irons, $k'$, firmly secured to the posts $b\ c$, as shown.

For connecting the follower $l$ with the frame in a manner convenient for quickly adjusting it to and removing it from the baling-box $i$, I suspend the follower by ropes or chains $m$, attached to its cross-bar $l'$, and passing over pulleys $n$, pivoted on cross-tie $f$, to suspend follower $l$ directly over the baling-chamber, said ropes or chains $m$ leading from pulleys $n$ to any convenient points within reach of the attendants, to be drawn upon by them for raising the follower, which is guided by the side extensions of its cross-bar $l'$ working in the slots $e$ of the frame, said slots being open at the top to permit the entrance of cross-bar $l'$, and also allow the follower to be swung forward over the tops of the frame-posts $c$ upon the platform $o$, to afford better access to the baling-box $i$ for charging it with the material to be pressed, said platform $o$ making the press-frame more substantial by forming a tie and brace by its brackets $o'$ to the heads of posts $c$.

For operating the follower to press the bale, I employ levers $p$, hung in clips or links $r$ from the follower cross-bar $l'$, said levers $p$ passing through the slots in the sides or ends of box $i$ and the guide-slots $e$, and having stop-shoulders $q$ acting against the posts $b\ c$, to limit their inward reach, the levers having check-pins $s$, to prevent their withdrawal from working position when in use. The levers $p$ act upon and beneath stout pins $t$ as fulcrums in drawing or forcing down the follower with a power proportioned to the length of the levers, the pins $t$ being placed in any one of a series of holes, $u$, in the frame.

In working the press the baling-box $i$ is closed at the bottom by the plate $i^4$ and bars $k$, and the follower lifted by cords or chains $m$, and the box $i$ charged with the hay, cotton, or other material to be baled, whereupon the follower is lowered thereon and forced downward powerfully by engaging the levers with fulcrum-pins $t$, placed in successively lower holes $u$ until the desired compression is obtained and the tie-grooves of the follower range below the bevel-joint $i^3$, when the bars $k$ are removed to permit the plates $i^4$ to fall, when the bale may be tied, the follower released and lifted, and the bale discharged.

In charging the baling-box, the follower $l$ may be swung over on platform $o$, or lifted high by ropes $m$, and the material required for a bale may be charged at once into box $i$, or by successive increments, as may be desired.

Having thus fully described my invention, I claim as new and desire to secure by Letters Patent—

1. The combination, with the cross-bar $l'$ of the follower, working in slots of the baling-box $i$ and in the guideways $e$ of the frame, of the levers $p$, linked to bar $l'$ of the follower and working beneath fulcrum-pins $t$, set into apertures $u$ of the frame, said levers being provided with stop-shoulders $q$ and check-pins $s$, substantially as shown and described.

2. The levers $p$, linked to the cross-bar $l'$ of follower $l$, passed into guideways $e$ of the frame, and provided with stop-shoulders $q$ and check-pins $s$, substantially as shown and described.

JOHN COCKE, JR.

Witnesses:
WM. E. YERBY,
JAS. W. BONDURANT.